No. 820,270. PATENTED MAY 8, 1906.
J. A. TAYLOR.
ANIMAL RELEASING MECHANISM.
APPLICATION FILED NOV. 16, 1905.
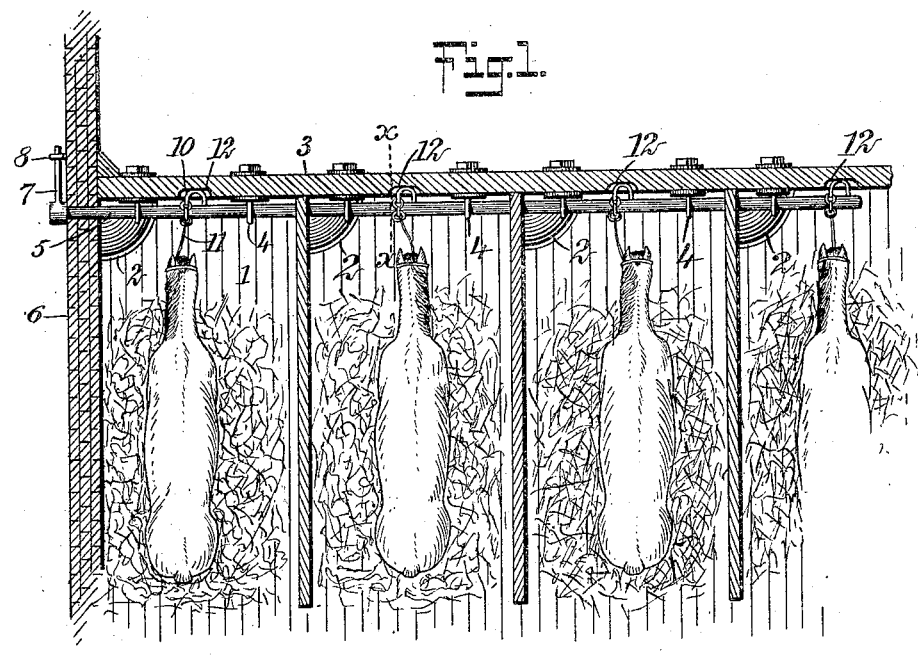
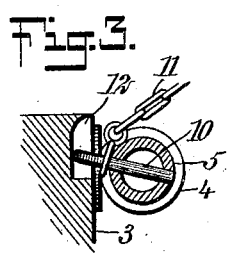 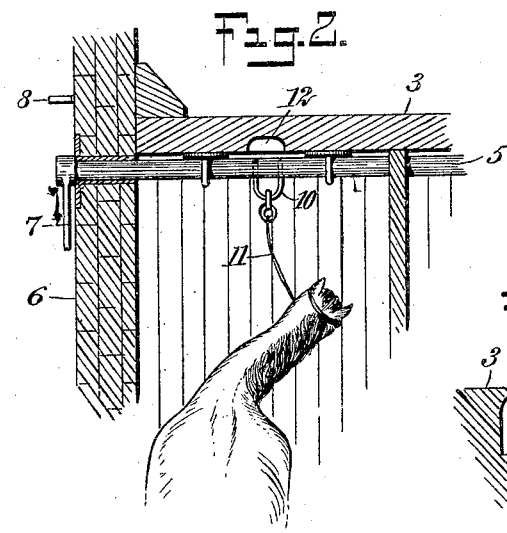 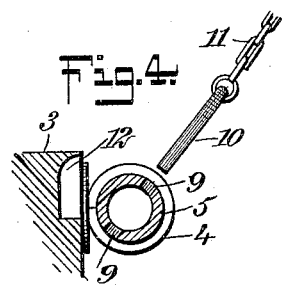
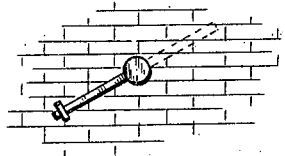
WITNESSES:
INVENTOR
John A. Taylor
BY
ATTORNEYS

UNITED STATES PATENT OFFICE.

JOHN A. TAYLOR, OF SACO, MONTANA.

ANIMAL-RELEASING MECHANISM.

No. 820,270. Specification of Letters Patent. Patented May 8, 1906.

Application filed November 16, 1905. Serial No. 287,620.

*To all whom it may concern:*

Be it known that I, JOHN A. TAYLOR, a citizen of the United States, and a resident of Saco, in the county of Valley and State of Montana, have invented a new and Improved Animal-Releasing Mechanism, of which the following is a full, clear, and exact description.

This invention relates particularly to improvements in means for releasing horses from their stalls in case of fire or other accident in the barn or stable, the object being to provide a simple means adapted to be operated from the outer side of a barn or stable, whereby the several horses that may be in a row of stalls can be simultaneously released.

I will describe an animal-releasing mechanism embodying my invention and then point out the novel features in the appended claims.

Figure 1 is a plan showing a releasing mechanism embodying my invention and showing animals as secured. Fig. 2 is a plan showing the position of parts when releasing. Fig. 3 is a section on the line $x$ $x$ of Fig. 1. Fig. 4 is a sectional detail showing one of the fastening devices as released, and Fig. 5 indicates the turning crank or handle.

Referring to the drawings, 1 designates stalls in a stable, having the usual feed troughs or mangers 2, and a front end wall is indicated at 3. Mounted to rotate in bearings 4, secured to the end wall 3 and extending along the front portions of the several stalls in a row, is a shaft 5, one end of which extends through the well 6 of a barn or stable and is provided at its outer end with a crank or handle 7, which when the shaft is turned to locking position is engaged with a keeper 8. The shaft 5 is designed to be arranged below the horses' heads, and in each stall it is provided with perforations 9 for receiving the members of a loop 10, with which the fastening strap or loop 11 is designed to connect.

When in fastening position, the shaft 5 is to be turned to engage the loops 10 in notches 12, formed in the headboard 3, thus preventing the accidental drawing out of said loops. In case of accident such as fire the shaft is to be rotated to the position indicated in Fig. 2. Then the loops 10 are readily drawn out by the horses in backing out of the stalls.

Having thus described my invention, I claim as new and desire to secure by Letters Patent—

1. A releasing device for animals in stalls, comprising a shaft extending across the inner ends of the stalls and mounted to rotate, the said shaft having one end extended through the outer wall of the barn or stable and provided with a handle, and a loop removably engaging with the shaft, in each stall.

2. An animal-releasing mechanism for animals in stalls, comprising a shaft extended across the inner ends of the several stalls in a row, the said shaft being provided with perforations at the portions within the stalls, loops engaging removably in said perforations, an inner end wall for the stalls, having notches for receiving said loops.

3. The combination with a series of stalls in a row, of a rotary shaft extending across the inner ends of said stalls, and detachable loops carried by the shaft.

In testimony whereof I have signed my name to this specification in the presence of two subscribing witnesses.

JOHN A. TAYLOR.

Witnesses:
J. W. CRUTCHFIELD,
J. S. PACH.